UNITED STATES PATENT OFFICE.

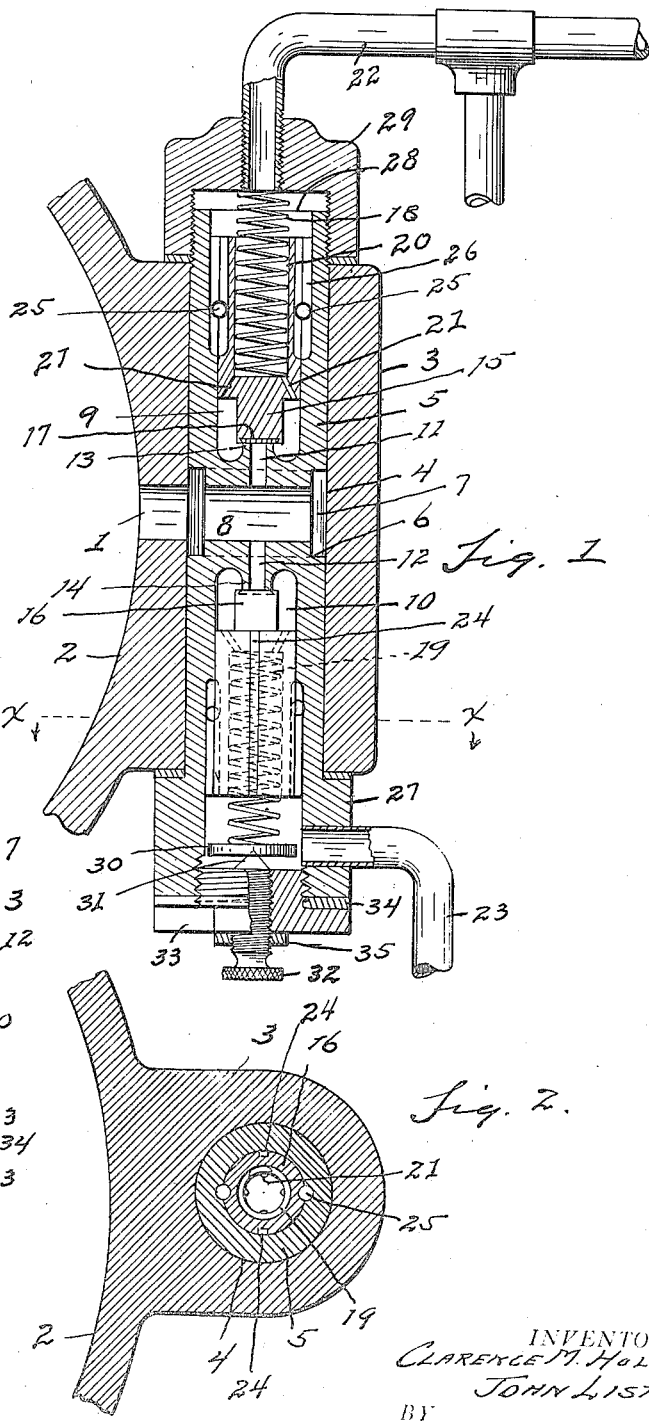

CLARENCE M. HOLLEY AND JOHN LIST, OF DETROIT, MICHIGAN, ASSIGNORS TO UTILITY COMPRESSOR CO., OF DETROIT, MICHIGAN, A CORPORATION OF MICHIGAN.

VALVE.

1,166,210.  Specification of Letters Patent.  Patented Dec. 28, 1915.

Application filed February 5, 1914. Serial No. 816,701.

*To all whom it may concern:*

Be it known that we, CLARENCE M. HOLLEY and JOHN LIST, citizens of the United States, residing at Detroit, county of Wayne, State of Michigan, have invented a certain new and useful Improvement in Valves, and declare the following to be a full, clear, and exact description of the same, such as will enable others skilled in the art to which it pertains to make and use the same, reference being had to the accompanying drawings, which form a part of this specification.

This invention relates to valves, more particularly of that type known as check valves, and its primary object is a valve structure in which the valve seat and the head may be held in proper alinement one with the other, and in which the valve may be removed from the valve chamber and replaced in substantially its original relation with the seat.

Heretofore with valves having a flat face engaging a seat it was a difficult matter to assemble the valve in its original relation with the seat after it had once been disassembled, causing a leakage between the seat and the valve due principally to the fact that the nut or cap used to close the valve chamber does not a second time screw into place in exactly the same relation as it was originally set, tipping the valve slightly to one side or the other.

An object of the invention resides in the structural arrangement whereby a derangement of the valve relative to the seat is prevented and the valve head made to engage the seat in identically the same relation at each operation thereof.

Another object resides in the structure and arrangement of parts whereby both the valve and its seat may be readily removed from the associated device or apparatus, and a further object is in the arrangement of parts whereby two valves of the same general type may be utilized to control separate conduits, one valve being regulatable whereby it may operate at various desired pressures and the other being operable at a single predetermined pressure.

These and other objects and novelties of the invention are hereinafter more fully described and claimed and shown in the accompanying drawings in which—

Figure 1 is a vertical section of our improved valve and support in operative relation with the discharge conduit of a fluid compressor, of which only part of the casting or body is shown. Fig. 2 is a section on line *x*—*x* of Fig. 1. Fig. 3 is a detail showing a tapered valve carried by the removable cage.

Similar characters refer to similar parts throughout the drawings and specification.

The drawing represents the valve and related structure adapted for use with and controlling the discharge conduit 1 of a fluid compressor, a portion 2 of the discharge chamber only being shown which is provided with an enlargement 3, having a central bore 4 into which the conduit 1 leads. Fitting the bore 4 is a cylindrical valve cage or holder 5 whose outer wall, substantially midway between the ends thereof, is circumferentially grooved at 6, forming a chamber 7 in registration with the conduit 1. The holder 5 is also provided with a cross-bore 8 leading into the chamber 7 by which arrangement it is not necessary that the bore 8 be in registration with the conduit 1, and holder 5 may be turned on its axis in any desired position. In reassembling the parts after cleaning or making repairs to the valve structure, the operator is relieved of the necessity of carefully setting said parts in registration as the groove 6 is of such width as to allow considerable alteration of the position of the cage longitudinally of the casing 3.

In the form shown, the holder 5 is provided with chambers 9 and 10 at each end respectively which are similar in all general respects. A conduit 11 leads from the cross-bore 8 to the chamber 9, and a conduit 12 leads into the chamber 10, and the bottom of each chamber is formed to provide a seat 13 and 14 about the conduits for the valves 15 and 16 respectively. Both valve heads are provided with a flat soft metal face 17 normally engaging the seat under action of a spring 18 and 19 respectively. Each valve body has a central bore 20 to receive the spring, and the head of the valve is less in diameter than the body, providing a chamber about the head in each instance. The body is provided with drill holes 21, 21, forming a passageway between the chamber about the head of the valve and the chamber 20 in the valve body from whence the fluid may pass to the conduit 22 or 23, in each instance respectively. As shown in the lower part of Fig. 1, and in Fig. 2 the valve body may also be longitudinally grooved at 24 upon opposite sides thereof, also forming a passageway for fluid around the valve body.

The valve is held from rotation relative to the cage or holder and to its seat by means of balls 25, 25, which ride in channels 26 on opposite sides of the body, half of which channel is formed in the valve body and half in the cylinder wall. These balls also provide a means whereby the valve may move freely and easily, longitudinally of the chamber and prevent a sticking of the valve in the chamber, as by this arrangement the valve body does not necessarily closely engage the chamber wall.

The cylindrical valve holder or cage is preferably provided with a square or hexagonal head 27, the opposite end 28 being threaded for the reception of the nut 29, and by tightening the nut, the head 27 is drawn tightly into engagement with the wall, supporting the cylinder, and the nut 29 tightly engages the opposite side thereof. By interposing a packing between both the head 27 and the nut 29, and the wall of the chamber, leakage of fluid about the holder is prevented.

The cage 5 may be so formed as to contain but a single check valve, but it is preferable that such arrangement should involve the cross-bore 8 and the circumferential groove 6. The double form shown is adaptable for use in any position where apparatus connected with a pipe line 22 is to be continuously supplied with fluid at whatever pressure the compressor is operating, and the valve 16 is arranged to be set to operate at a certain predetermined pressure whereby the conduit 26 is not supplied with fluid until such pressure is attained. To perform this function the outer end of the valve spring 19 rests upon a button 30 having a central cone-shaped depression engaging the point 31 of the adjusting screw 32. By turning this screw greater or less tension of a spring 19 is produced and the pressure at which the valve 16 may operate may thus be varied. The screw 32 is threaded in a central aperture in the cap nut 33 closing the end of the valve chamber, and the packing 34 is interposed between the nut and the end of the cylinder to prevent leakage therefrom. The screw 32 may be provided with a lock nut 35 to prevent accidental displacement thereof.

From the foregoing description it may be readily seen that either valve 15 or 16 may be set in position in their respective chambers, and, by tapping lightly on the upper end of the valve, the soft face made to tightly engage the seat at all points. It often happens in practice that the face of the valve is not absolutely square with the seat whereby leakage may occur, but by making the face of the valve of soft material and by driving it against a seat of harder material, the seat engages the face of the valve at all points and leakage is prevented. Also by holding the valve from rotation relative to the seat, the valve always engages the seat in the same manner and a seat having a high point or side always engages the side of the valve with which it was originally set.

By marking the valve body and the wall of the cylinder, or by other expedient, the valve body may, after being disassembled, be again set into the chamber in its identical original relation. In removing the valve structure from the casing 3 or other apparatus with which it is connected, both the seat and the valve are removed as a unit and the relation of the valve and its seat is not disturbed in any manner either by the removal or the replacing thereof. This feature is of value, particularly in the replacing of worn valves and the like, which ordinarily gives rise to considerable trouble, due to the fact that a new valve is set in place in the device to operate against a fixed seat which has become worn under the action of the previous valve, while, with the structure herein disclosed, in replacing a worn part both the valve and the seat are replaced with new parts set in the desired relation which is maintained during the life of both the valve and seat.

The removable cage and valve arrangement shown is particularly adapted for use with the compressor shown in our pending application Serial Number 806,805, filed December 15, 1913, in which case the lower valve shown in Fig. 1 of this application would operate only at a predetermined pressure. The tapered valve and seat shown in Fig. 3 may be readily utilized in place of the lower valve shown in Fig. 1 as the tapered form will remain seated until the required pressure is attained and under conditions in which a flat faced valve will lift slightly and leakage occur. The tapered valve and seat are here shown as indicative of the fact that check valves of various types may be utilized with the removable cage.

Having thus briefly described our improved valve and related structure, and the utility thereof, what we claim and desire to secure by Letters Patent of the United States is—

1. In a valve, a casing, a valve cage removably secured therein, a seat for the valve carried by the cage, a valve head provided with a soft metal face, a valve body having portions engaging the wall of the cage and having a channel or channels of substantially equal depth in said meeting faces of both the body and the cage wall, and a ball in said channel or channels.

2. In a valve, a casing, a cage removably secured therein, a valve reciprocable in said cage, a seat for the valve carried by the cage, a valve head provided with a soft metal face for engaging the seat, portions of the valve body engaging the wall of the cage, there being a channel or channels equidistantly cut into each of the said engaging faces, a ball in each channel, and a spring for holding the valve on its seat.

3. In a valve, a casing, a cage removably secured therein, a valve reciprocable in said cage, a seat for the valve carried by the cage, a valve head provided with a soft metal face for engaging the seat, portions of the valve body engaging the wall of the cage, there being a channel or channels equidistantly cut into each of the said engaging faces, a ball in each channel, and a spring for holding the valve on its seat, and means for adjusting the tension of the spring.

4. In combination with a casing having a central bore and an inlet leading thereinto, of a cylindrical valve holder or cage having a circumferential groove registering with said inlet, there being a passageway through the cage at the bottom of the groove, said holder being chambered, a conduit leading from said cross-passageway to said chamber, a seat in the chamber about said conduit, a valve reciprocable in the chamber having a body provided with portions engaging the wall of the chamber, channels formed partly in the body and partly in the contiguous wall of the chamber, a ball in each of said channels, a valve head less in diameter than the body provided with a soft metal face, channels formed in the valve body in communication with the chamber about the head, and a spring holding the valve on its seat.

5. In combination, a casing having an inlet, a valve cage fitting said casing having a conduit extending longitudinally therethrough and open to said inlet substantially midway between the ends thereof, a valve on each side of the central opening controlling the said conduit, a seat for each of said valves, said valves having a soft metal face, and means individual to each of the valves preventing rotation thereof in the cage.

6. In combination, a casing having an inlet, a valve cage closely fitting therein, said cage having a circumferential groove registering with said inlet and having a cross conduit therethrough at the bottom of the groove, said cage also being chambered each side of said groove and having conduits connecting the chambers and the cross conduit, a valve in each of said chambers controlling the conduit leading thereinto, and means for securing the cage in the casing in a manner to prevent leakage.

7. In a valve, a cylindrical supporting case provided with a seat for a valve, a valve head having portions engaging the wall of the case and adapted to reciprocate therein, both the case and valve head having longitudinal channels of substantially equal depth formed in the meeting faces thereof, and a ball in each of said channels which prevents rotation of the valve head.

In testimony whereof, we sign this specification in the presence of two witnesses.

CLARENCE M. HOLLEY.
JOHN LIST.

Witnesses:
RUBY L. COOK,
RICHARD ALSPAS.